No. 797,246. PATENTED AUG. 15, 1905.
H. J. WILLIAMS.
CORKING MACHINE.
APPLICATION FILED OCT. 6, 1904.

3 SHEETS—SHEET 1.

No. 797,246. PATENTED AUG. 15, 1905.
H. J. WILLIAMS.
CORKING MACHINE.
APPLICATION FILED OCT. 6, 1904.
3 SHEETS—SHEET 2.
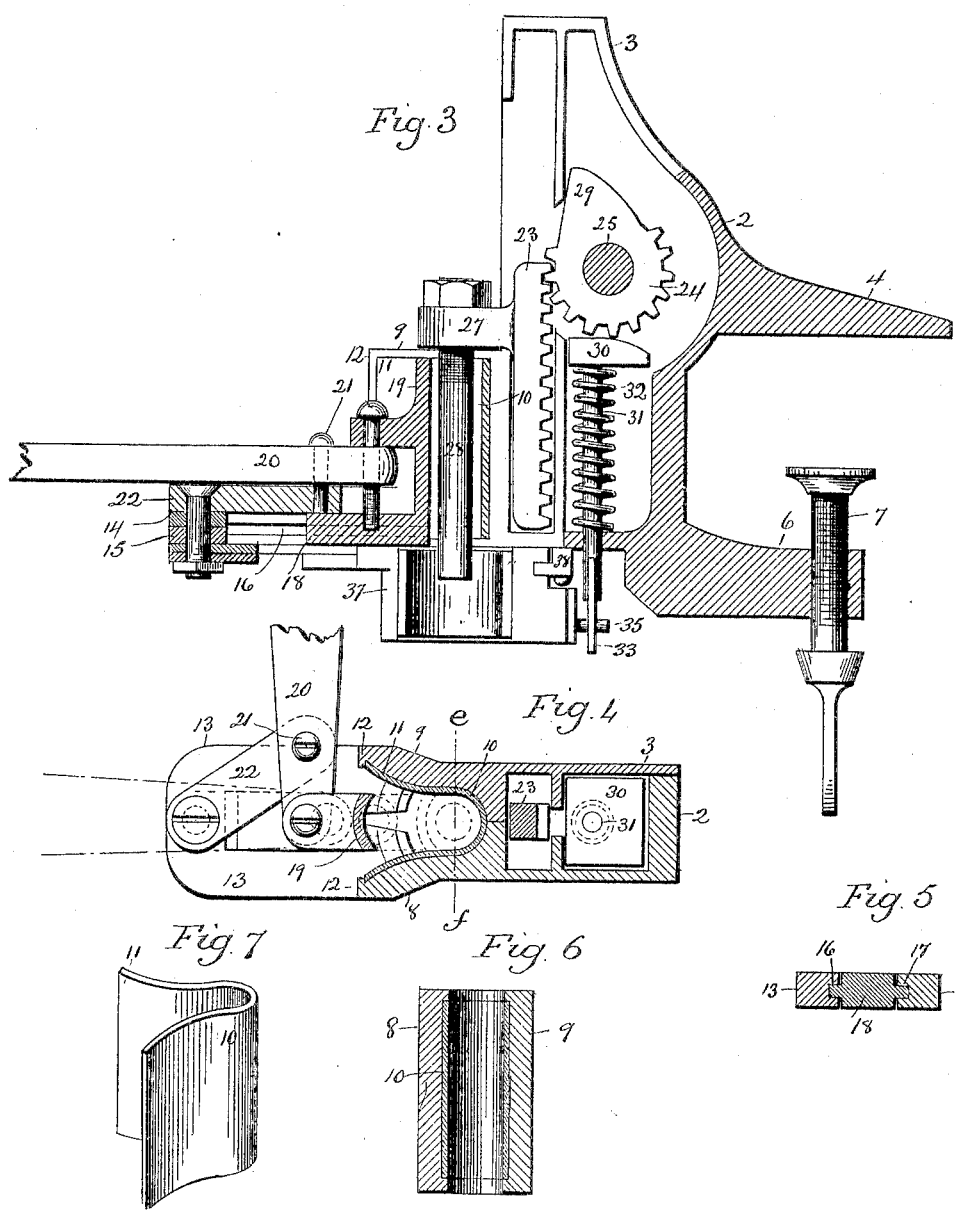

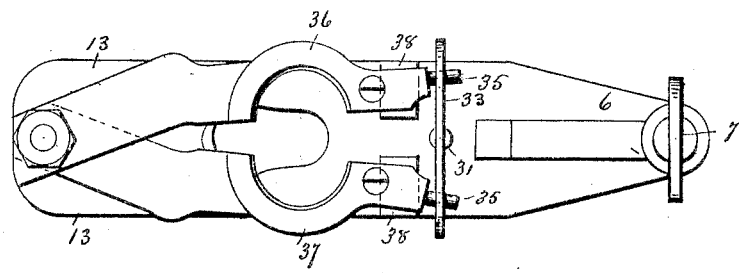
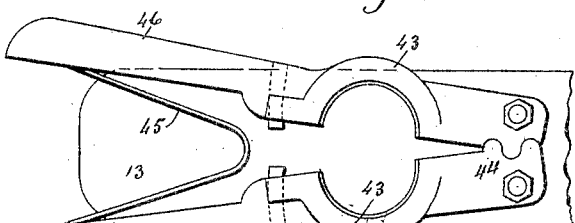
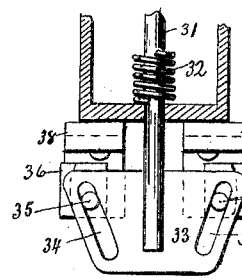
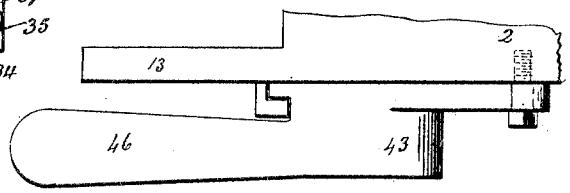
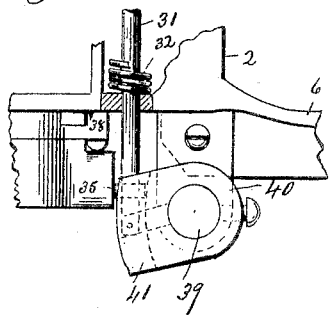
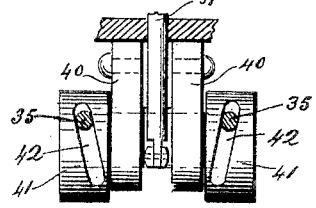

UNITED STATES PATENT OFFICE.

HARRY J. WILLIAMS, OF MERIDEN, CONNECTICUT.

CORKING-MACHINE.

No. 797,246. Specification of Letters Patent. Patented Aug. 15, 1905.

Application filed October 6, 1904. Serial No. 227,408.

*To all whom it may concern:*

Be it known that I, HARRY J. WILLIAMS, a citizen of the United States, residing at Meriden, in the county of New Haven and State of Connecticut, have invented a new and useful Improvement in Corking-Machines; and I do hereby declare the following, when taken in connection with the accompanying drawings, and the figures of reference marked thereon, to be a full, clear, and exact description of the same, and which said drawings constitute part of this specification, and represent, in—

Figure 1:
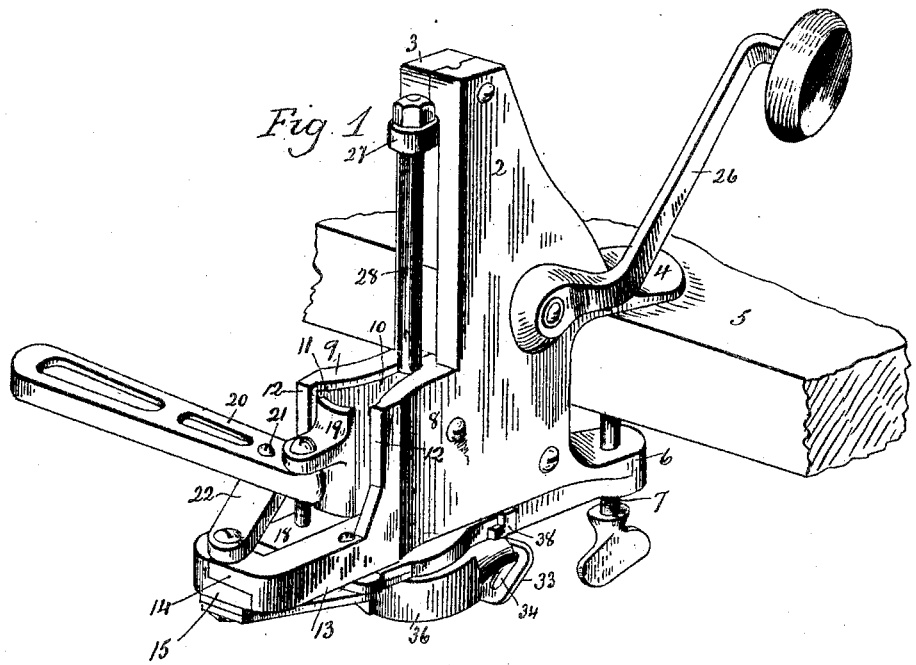
Figure 2:
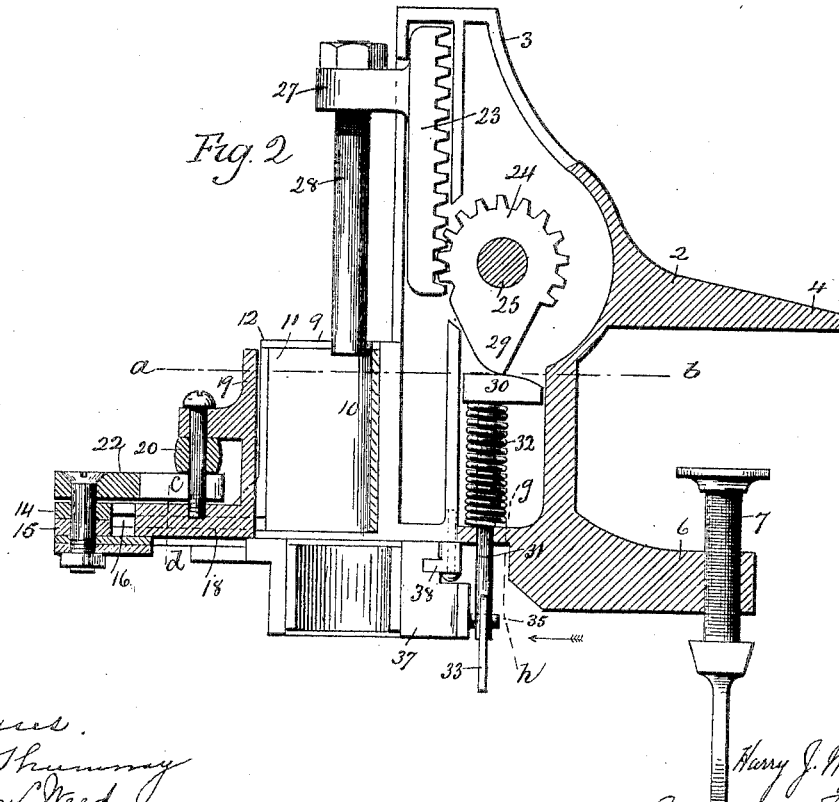

Figure 1, a perspective view of a corking-machine constructed in accordance with my invention; Fig. 2, a longitudinal sectional view of the same; Fig. 3, a similar view with the plunger depressed; Fig. 4, a sectional view on the line $a\,b$ of Fig. 2; Fig. 5, a sectional view on the line $c\,d$ of Fig. 2; Fig. 6, a sectional view on the line $e\,f$ of Fig. 4; Fig. 7, a perspective view of the cork-contractor, detached; Fig. 8, an under side view of the machine; Fig. 9, a sectional view on the line $g\,h$ of Fig. 2; Fig. 10, a broken side view showing a modified form of means for operating the bottle-gripping jaws; Fig. 11, a broken front view of the same; Fig. 12, an under side view of the machine provided with bottle-gripping jaws movable independent of the corking mechanism; Fig. 13, a side view of the same.

This invention relates to an improvement in corking-machines, and particularly to that class of devices which are arranged for corking one bottle at a time and which provide means for holding a bottle, compressing the cork and forcing it into the neck of the bottle, the object of the invention being a simple arrangement of parts whereby these various operations may be conveniently and easily performed; and the invention consists in the construction as hereinafter described, and particularly recited in the claims.

In carrying out my invention I employ a housing 2, and a side or cap plate 3, secured thereto. The housing is formed with a lug 4 to bear upon the upper surface of a board or table 5, and with a lug 6, carrying a clamping-screw 7, by which the housing may be clamped to a board or table. The lower wall 8 of the housing projects forward, and the cap or plate has a similar wall 9, the two forming a pocket for the reception of a cork-contractor 10. This is formed from comparatively heavy sheet or cast metal and is of substantially U shape with flaring ends 11, which are seated against the outer edges 12 of the walls 8 and 9, so as to be readily held thereby. The lower edges of the housing and cap have forwardly-projecting arms 13 with overlapping ends 14 15 and with longitudinal grooves 16 17 in their inner walls to receive and guide a slide 18, carrying a cork-presser 19 at its inner end, this presser being adapted to enter between the flaring ends 11 of the cork-contractor 10. The slide 18 is operated by a lever 20, which is connected by a screw or pin 21 with one end of a link 22, which is pivoted at the outer end of the arms 13, whereby the turning of the lever moves the slide 18 in a straight line and permits of necessary pressure to be applied thereto. Within the housing is a vertically-guided rack 23, meshing with a pinion 24, mounted upon a shaft 25, which projects through the housing and to which an operating-handle 26 is connected. From the rack 23 an arm 27 projects outward, supporting a plunger 28, which by the movement of the rack passes up and down through the contracted portion of the contractor 10. Turning upon the shaft 25 and fixed to or formed with the pinion 24 is a cam 29, bearing upon a head 30 at the top of a rod 31, which projects downward through the housing and on which is a spring 32, the tendency of which is to force the head upward. Preferably this rod 31 at its lower end will carry a plate 33, having inclined cam-slots 34, which receive studs 35, projecting from two bottle-clamping jaws 36 37, which at their outer ends are pivoted to the outer ends of the arms 13, it being understood that the jaws 36 37 are arranged in line with the plunger 28 and may be guided for transverse movement by shoulders 38, secured to or formed integral with the under face of the housing, the cam 29 and pinion 24 being so arranged that the head 30 will be released, whereby the cam-plate may be lifted by its spring 32, and thereby yieldingly close the bottle-holding jaws 36 37 before the plunger 28 is moved downward to any material extent.

In operation the handle 26 is turned so as to raise the plunger 28 to its highest point, at which time the cam-plate 33 is depressed so as to permit the bottle-holding jaws to be opened. A cork is placed in the contractor and the lever 20 turned, forcing the presser 19 into the contractor and against a cork therein. When the cork is sufficiently compressed, the neck of the bottle is placed between the jaws 36 37 and the handle 26 turned. The first movement of the handle releases the head 30, allowing the cam-plate 33 to rise under the action of the spring 32, and thereby yieldingly hold the bottle in position. The continued movement of the handle 26 turns the pinion 24 and moves the rack 23 downward, forcing the plunger 28 with it, the plunger 28 striking the upper end of the cork and forcing it into the neck of a bottle held beneath it. The return movement of the handle raises the plunger 28, and the completion of the return movement of the handle again depresses the head 30 and releases the bottle, ready for a repetition of the operation.

Instead of arranging the cam-plate 33 on the end of the rod 31 the lower end of the rod 31 may be connected with a transversely-arranged rock-shaft 39, mounted in trunnions 40, secured to the housing and providing this shaft with cams 41, having slots 42 to receive the lugs 35 and move in the same way as before described, or instead of providing for moving the bottle-holding jaws through the operation of the handle 26 they may be arranged entirely independent thereof, as in Figs. 12 and 13 of the drawings, 43 indicating the bottle-clamping jaws, which are substantially the same as those shown in the preceding figures, except that instead of pivoting them at the outer ends of the arms 13 they are pivoted at their inner ends to the under side of the housing and preferably with a knuckle-joint 44, so that the movement of one will move the other, and preferably a spring will be provided for normally holding them in their open position. As herein shown, a wire spring 45 is arranged between the handles 46, although the spring may be otherwise arranged.

Having fully described my invention, what I claim as new, and desire to secure by Letters Patent, is—

1. A corking-machine comprising a housing, a contractor carried thereby, means for forcing a cork into said contractor, a vertically-movable rack in said housing, a pinion meshing therewith for moving the same, a plunger carried by said rack and movable up and down through said contractor, a cam moved by said pinion, a vertically-arranged rod beneath said cam and adapted to be compressed thereby, bottle-gripping jaws arranged beneath said housing, and connection between said rod and jaws, whereby the movement of said rod will open or close said jaws, substantially as described.

2. A corking-machine comprising a housing, a contractor carried thereby, means for forcing a cork into said contractor, a vertically-movable rack in said housing, a plunger carried by said rack and adapted to be moved up and down through the contractor, a vertically-movable rod in said housing, an operating-handle connected with the pinion for moving said rack and rod, said rod provided at its lower end with a slotted cam-plate, and bottle-gripping jaws pivotally connected with said housing and having forwardly-extending studs engaging with said plate whereby by the movement of said plate said jaws are opened or closed, substantially as described.

3. A corking-machine comprising a housing, a contractor carried thereby and consisting of a strip of metal bent into U shape and having flaring ends, said housing provided with forwardly-extending arms, a block sliding between said arms and carrying a cork-presser adapted to be moved between the ends of said contractor, a lever connected directly with said slide and through a link with the outer end of said arms, substantially as described.

In testimony whereof I have signed this specification in the presence of two subscribing witnesses.

HARRY J. WILLIAMS.

Witnesses:
FREDERIC C. EARLE,
CLARA L. WEED.